(12) United States Patent
Rizzi

(10) Patent No.: US 7,524,468 B2
(45) Date of Patent: Apr. 28, 2009

(54) SEALING MEANS FOR CHEMICAL REACTOR

(75) Inventor: Enrico Rizzi, Grandate (IT)

(73) Assignee: Ammonia Casale S.A. (CH)

( * ) Notice: Subject to any disclaimer, the term of this patent is extended or adjusted under 35 U.S.C. 154(b) by 79 days.

(21) Appl. No.: 10/474,475

(22) PCT Filed: Apr. 8, 2002

(86) PCT No.: PCT/EP02/03839

§ 371 (c)(1),
(2), (4) Date: Oct. 8, 2003

(87) PCT Pub. No.: WO02/083287

PCT Pub. Date: Oct. 24, 2002

(65) Prior Publication Data

US 2004/0081599 A1      Apr. 29, 2004

(30) Foreign Application Priority Data

Apr. 11, 2001   (EP) ................................ 01109067

(51) Int. Cl.
*B01J 8/00*       (2006.01)
*B01J 19/00*      (2006.01)
*F16J 15/00*      (2006.01)
(52) U.S. Cl. .................. 422/221; 422/187; 422/129; 277/644; 277/647; 277/628
(58) Field of Classification Search .............. 422/179, 422/221
See application file for complete search history.

(56) References Cited

U.S. PATENT DOCUMENTS

| 1,571,605 | A | * | 2/1926 | Salles ........................ 220/804 |
| 2,080,685 | A | * | 5/1937 | Ashe .......................... 220/265 |
| 2,108,087 | A | * | 2/1938 | Thayer ....................... 422/218 |
| 2,351,362 | A | * | 6/1944 | Parker ........................ 285/116 |
| 3,345,078 | A |   | 10/1967 | Bialowski |
| 4,597,596 | A | * | 7/1986 | Tozer ......................... 285/187 |
| 5,456,865 | A | * | 10/1995 | Pluess et al. ............. 261/112.1 |
| 5,799,954 | A |   | 9/1998 | Layer |
| 6,170,805 | B1 |  | 1/2001 | Hug et al. |

FOREIGN PATENT DOCUMENTS

| EP | 358855 A2 * | 3/1990 |
| EP | 0 450 872 A1 | 10/1991 |
| EP | 0 841 301 A1 | 5/1998 |
| JP | 57-68129 A | 4/1982 |
| JP | 6231784 A | 8/1994 |

OTHER PUBLICATIONS

Machine Translation of EP 0 358 855 A2. No Date.*

* cited by examiner

*Primary Examiner*—Jennifer A Leung
(74) *Attorney, Agent, or Firm*—Akerman Senterfitt

(57) ABSTRACT

A safe, reliable chemical reactor (1, 20) with a simple construction, easy to assemble and to disassemble comprises a casing (2), a male member (3) supported by the casing (2) and inserted with a certain clearance in a female member (4) associated to the casing (2), as well as a metallic foil (10) capable of being deformed fixedly connected to the male member (3) and protruding into said clearance (8), in order to hinder the fluid passage through the clearance.

8 Claims, 4 Drawing Sheets

SEALING MEANS FOR CHEMICAL REACTOR

DESCRIPTION

1. Field of Application

The present invention relates to a chemical reactor, of the type comprising a casing, a male member supported by the casing and inserted with clearance in a female member associated to the casing, as well as sealing means to hinder the fluid passage through the clearance between the male and female members.

2. Prior Art

Chemical reactors of the above specified type generally have a big size and, when manufacturing the various elements which they consist of, too strict mechanical tolerances cannot be imposed, as this would reflect in unjustifiably high costs of construction. In fact, the various elements have under all aspects rather coarse tolerances, specifically as far as their dimensions, alignments, concentricity and surface finishing are concerned. In fact, such structures belong to the category of carpentry and boiler shop that has construction requirements completely different from those of the precision mechanics.

Thus, in general, the coupling between elements, such as for example the insertion of male members into female members, is usually arranged in such a way to guarantee a certain clearance, in order to avoid the danger of sticking, force-fitting during assembling or, even worse, the impossibility of inserting a member into the other one.

Thus, it is usually accepted that a certain clearance exists between the elements, once assembled. However, it is not accepted, or it is accepted only to a limited extent, that fluids, that are provided on either side of the coupled members, are able to freely pass through this clearance.

Sealing means has been suggested, in order to hinder the passage of the fluids through the clearance. For example, it has been suggested to insert into the clearance gaskets of the gland packing type, fastened to the male member when inserted into the female member. In this way the fluid passage is practically impossible. However, this technique implies the drawback of the time consuming and arduous assembling of the gland packing gaskets, practically carried out on site, in a completely craftmade way and requiring a direct accessibility of the operator. The drawback of the progressive damaging of the gland packing baskets has also been observed. This is due to the unavoidable mutual small displacements of the coupled members, with fraying for abrasion and subsequent erosion of the gland packings and with loss, by the gland packings, of part of the materials which they are woven with, until the complete dissolution of the gland packing itself occurs.

SUMMARY OF THE INVENTION

The problem underlying the present invention is that of devising a chemical reactor of the above specified type, which presents such structural and functional characteristics as to overcome the drawbacks mentioned with reference to the prior art.

Such problem is solved by a chemical reactor of the above specified type, which is characterized in that said sealing means comprises a foil within said clearance.

Advantageously, said foil is fixedly connected to the male member and protrudes into said clearance towards the female member.

Further features and the advantages of the chemical reactor according to the present invention will become clearer from the following description of an indicative and non-limiting example of embodiment thereof, made with reference to the attached drawings.

DETAILED DESCRIPTION

Figure 1:
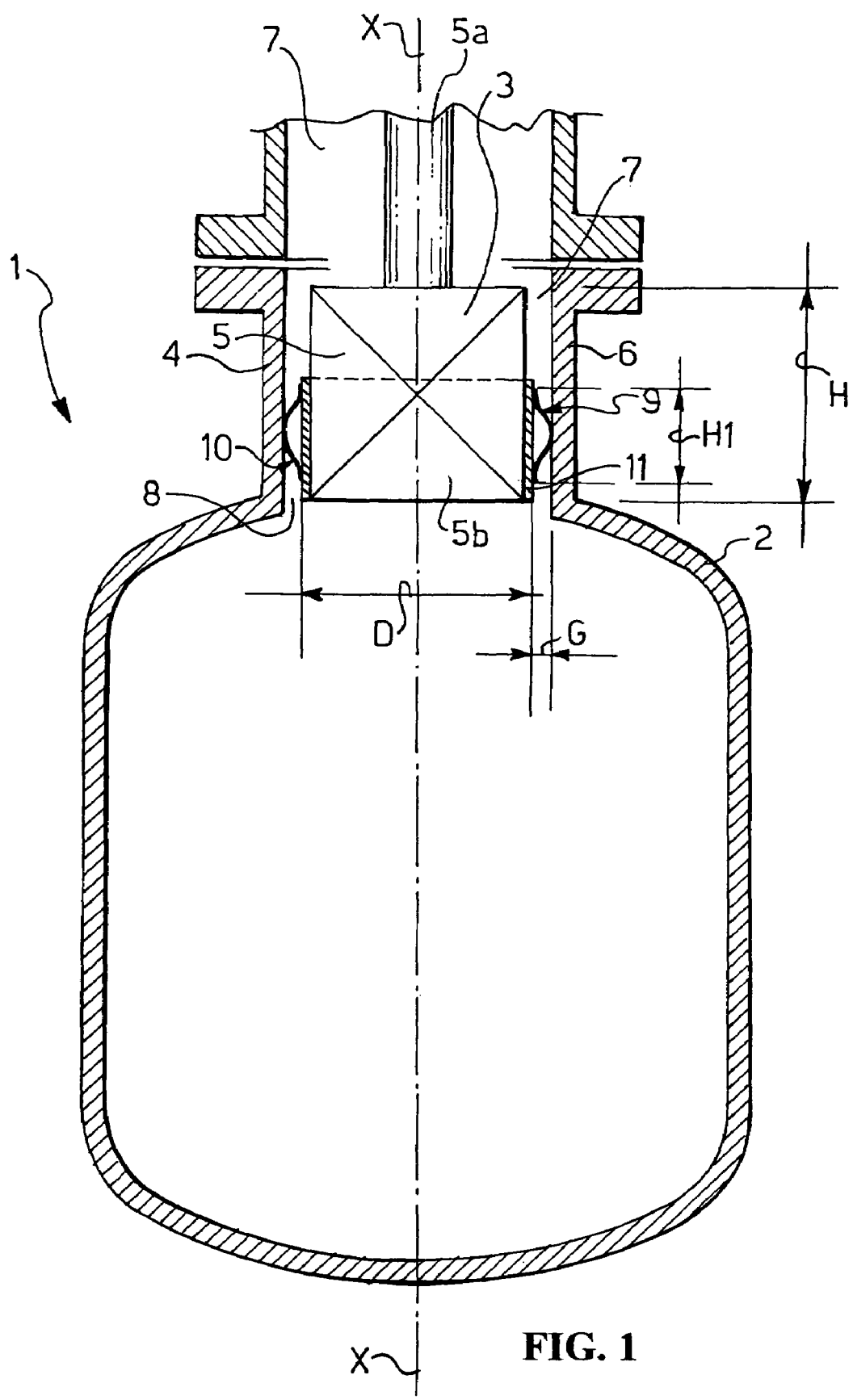
FIG. 1 shows a schematic section and elevation view of a chemical reactor according to the invention.
Figure 2:
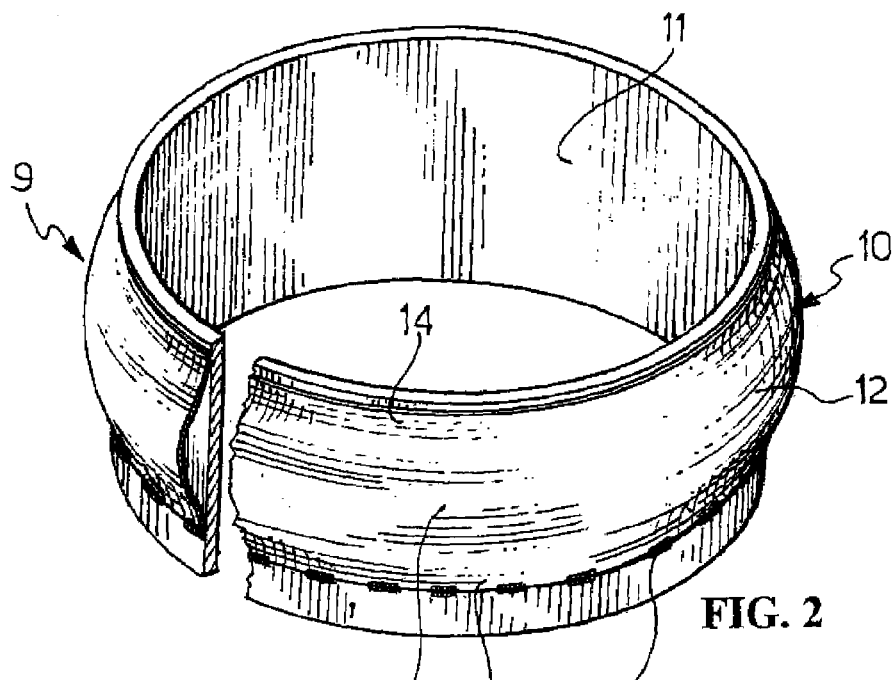
FIG. 2 shows an enlarged perspective view of a detail of the chemical reactor of FIG. 1.

With reference to the attached figures, a chemical reactor is indicated in its whole with reference numeral 1.

Chemical reactor 1 comprises a casing 2 and a male member 3 inserted with clearance into a female member 4. In particular, in the combustion reactor 1 the male member 3 is a burner 5, which has an elongated and cylindrical shape having axis X-X, supported by the casing at an end 5a thereof, and exhibits an opposite cantilevered end 5b, coaxially inserted with clearance into the female member 4, which is a shell 6 defining an opening 7 in the casing 2.

Between the outer surface 3a of the male member 3 and the inner surface 4a of the female member 4 an annular clearance 8 is formed. The male member 3 has a large, cross-sectional dimension in the range form 300 to 1500 mm. In the example, it has a diameter of about 600 mm. The clearance 8 has a large dimension as well, in the order of 1-2 cm. In the example, the clearance has a radial dimension G of about 10 mm.

The male member 3 and the female member 4 are inserted the one in the other by a height H.

The chemical reactor 1 further includes sealing means 9 arranged in the clearance 8, in order to hinder the fluid passage through the clearance itself.

The sealing means 9 comprises a metallic foil 10, made in the example of stainless steel, of a small thickness S, with S falling in the range from 0.1 to 1 mm, so to be capable of being deformed. In the example S is 0.3 mm.

The foil 3 is fixedly connected to the male member 3 and protrudes into said clearance up to press the female member 4.

Preferably, the foil 10 is fixedly connected to the male member 3 through a rigid sleeve 11, preferably made of steel, which is in turn fixedly connected to the male member 3, for example being welded onto the element 3 itself or being fitted onto it in a forced fit arrangement. In this way the sleeve 11 is an integral part of the male member 3.

The foil 10 is made of an annular band 12 with a predetermined height H1, for example comprised between 20 and 150 mm, preferably of about 1/10 of the diameter D. The annular band 12 has a first edge 13, which is placed at the cantilevered end 5b of the male element 3 and is fastened to the sleeve 11, for example with welding spots 11a, and has a second edge 14 opposite to the first edge 13, which is leaning and pressing against the sleeve 11, and has also an intermediate sealing portion 15, which is in press contact with the female member 4.

According to a preferred embodiment, the annular band has a substantially omega shaped section, wherein the two wings of omega correspond to the edges 13, 14, whereas the arc shaped portion of omega corresponds to the intermediate sealing portion 15.

Figure 3:
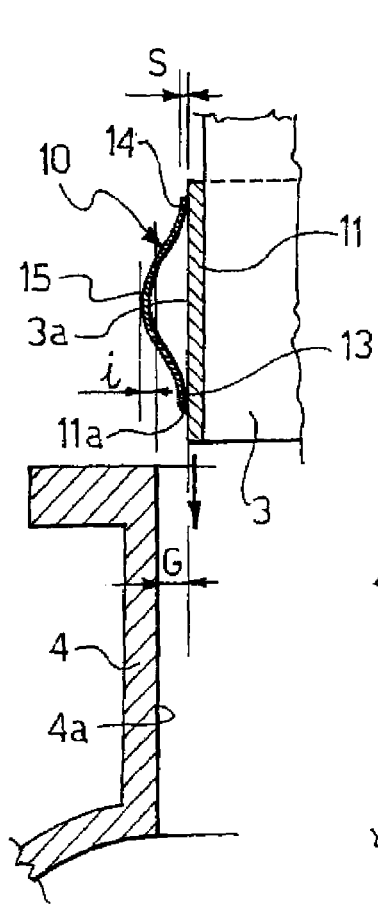
FIGS. 3, 4, 5 show schematic views of a detail of the chemical reactor according to the invention of FIG. 1; taken in subsequent steps of its operation.

The foil 10 is applied onto the sleeve 11 through welding by means of the aforesaid welding spot 11a, whereas the sleeve 11 is fitted onto the male member 3 to which it is fixedly connected through welding or fitting. So doing, the member 3 (see FIG. 3) is ready to be inserted into the female member 4.

It shall be noted that the intermediate sealing portion 15 sufficiently protrudes from the male member 3 so to interfere anyway with the inner surface 4a of the female member 4. For example a clearance i is formed, with an interference of 3-4 mm. The provided interference will increase with the increase of the construction tolerances of the female member.

Figure 4:
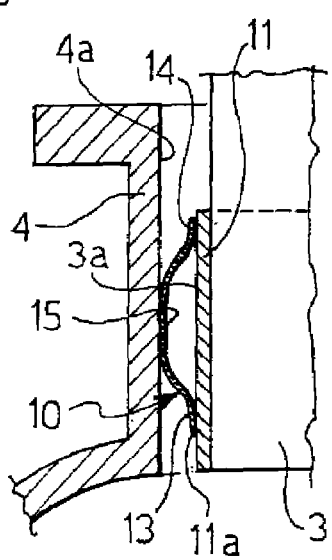

Inserting (see FIG. 4) the male member 3 into the female member 4 a pressing contact of the intermediate sealing portion 15 with the female member 4 is created and at least in the vicinity of the top of the intermediate sealing portion 15 firstly an elastic deformation and then according to the interference and to the dimensions of the sealing member, a permanent deformation 15a of the foil 10 take place.

Figure 5:
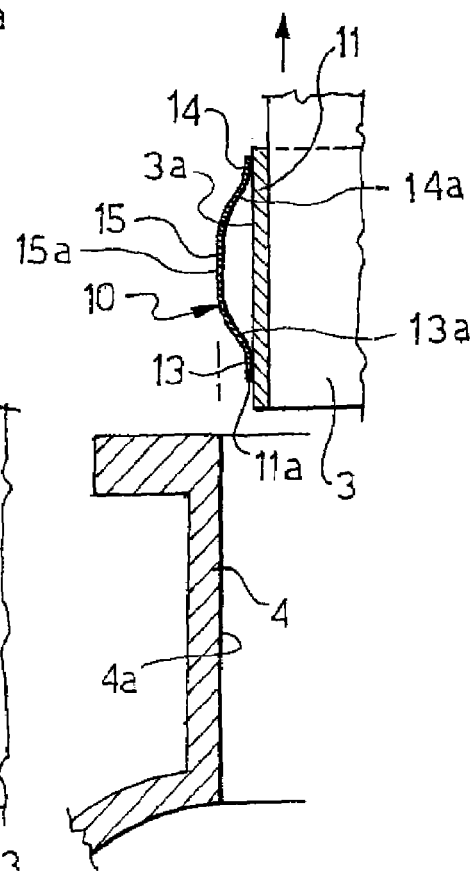

While opening the chemical reactor for maintenance or for any other reasons it is necessary to disassemble the male member 3, the latter is easily extracted from the female member (see FIG. 5). The foil 10 is also extracted and has a spring back part 13a, 14a and a permanent deformation part 15a and can be reused for a possible subsequent reassemble or, when damaged, can be easily replaced.

Figure 6:
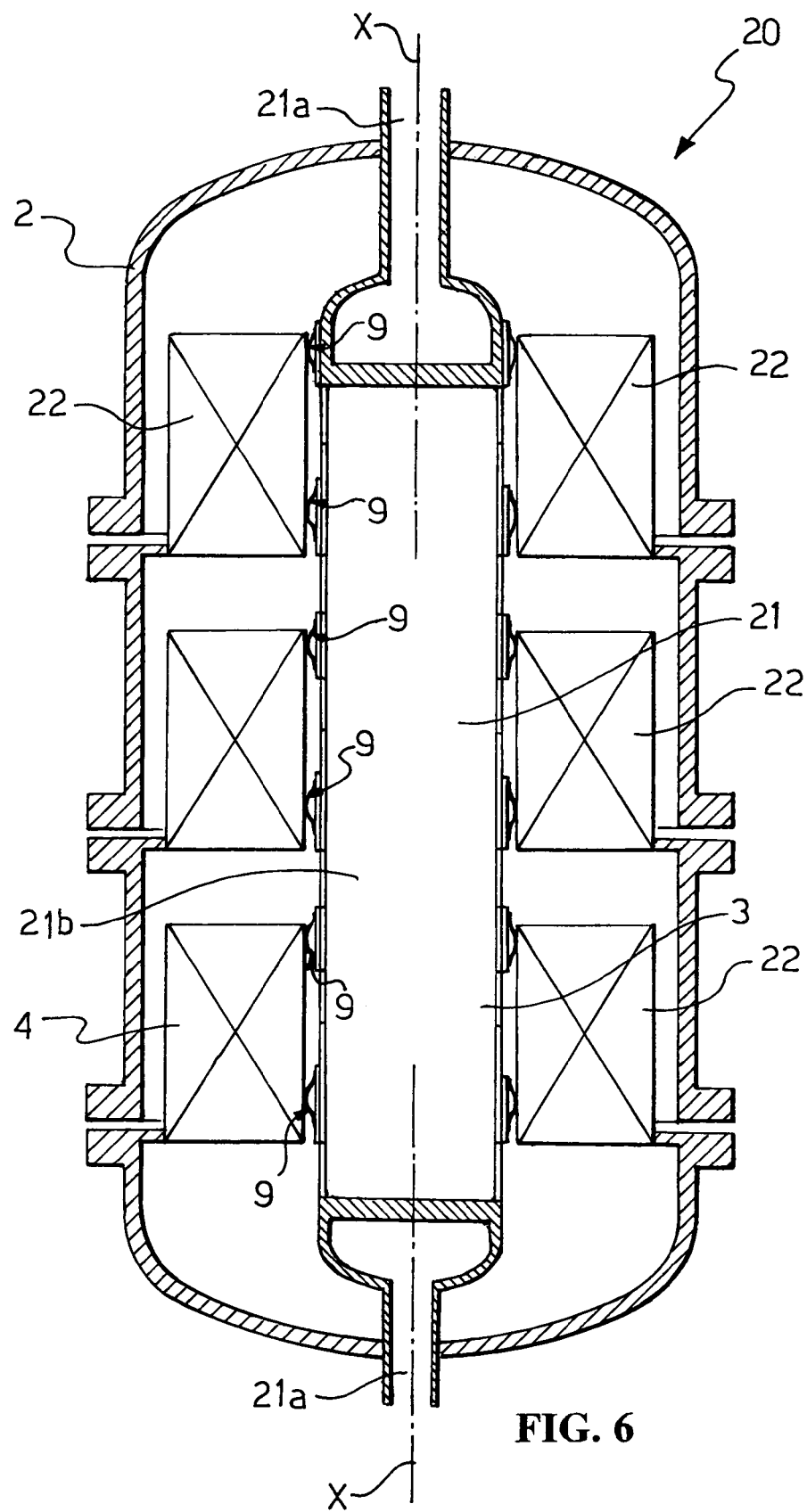
FIG. 6 shows a schematic elevation view of a chemical reactor of the invention, according to a further embodiment thereof.

A chemical reactor 20, according to a further embodiment of the invention is described with reference to FIG. 6, wherein the same structural and functional parts as those of the chemical reactor 1 have the same reference numerals.

In particular, in the synthesis reactor 20, the male member 3 is a cylindrical member, such as an heat exchanger 21 having opposite ends 21a supported by the casing 2 and a central part 21b, substantially a tube bundle, inserted with clearance into a female member 4 consisting of three superimposed coaxial annular catalytic beds 22.

Between the heat exchanger 21 and each of the three catalytic beds 22 two sealing means 9 are provided, each one being identical to the above described sealing means.

Figure 7:
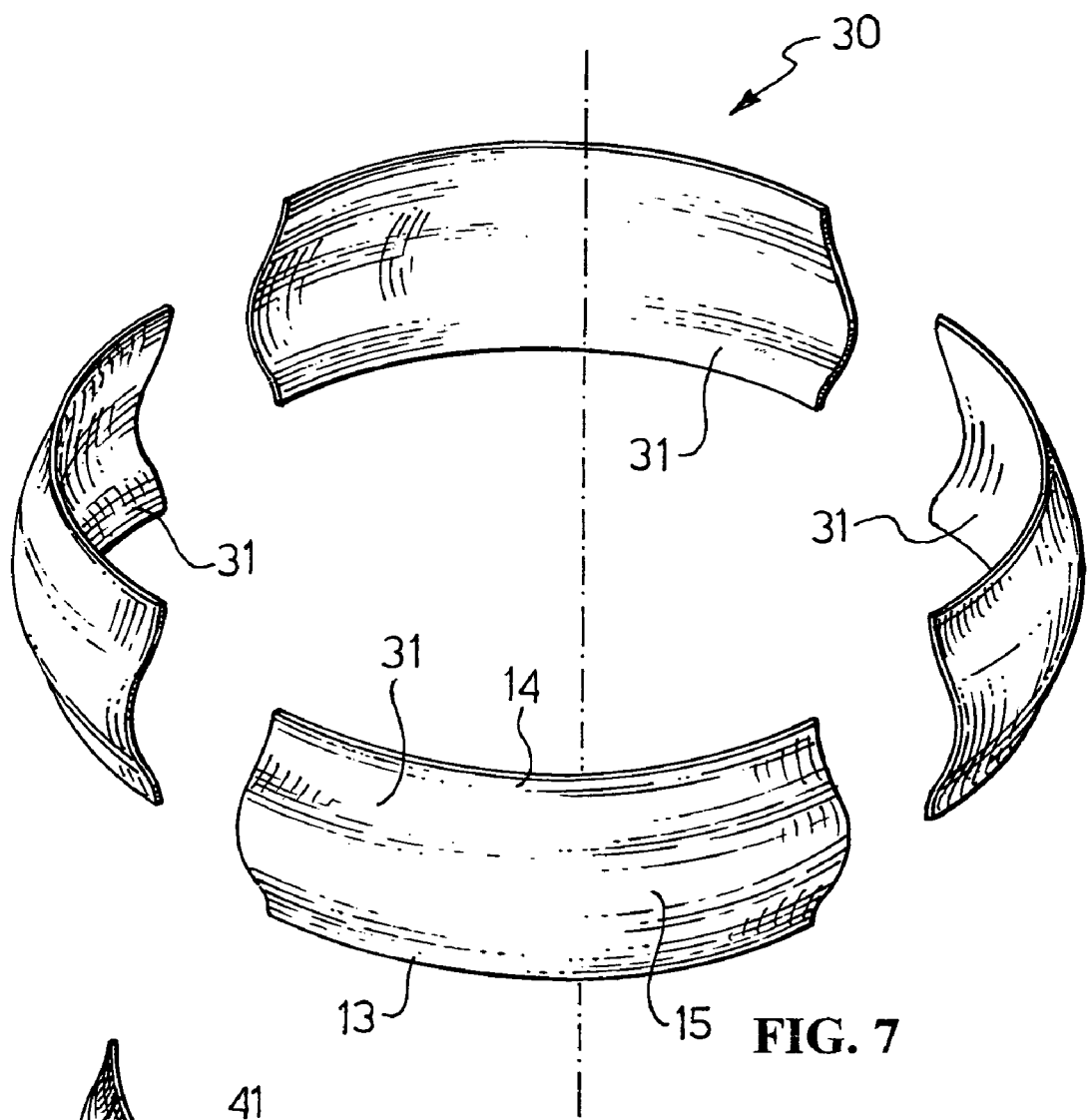
FIG. 7 shows a partial, perspective and exploded view of the detail of FIG. 2 according to an alternative embodiment; and finally

A foil 30 according to an alternative embodiment of the invention is described with reference to FIG. 7, wherein the parts that are structurally and functionally equivalent to those of the foil 10, have the same reference numerals. The foil 30 is advantageously made of a plurality of sectors all indicated with 31, in the example of four sectors, of the same angular amplitude, each easily obtained through drawing. Each sector is fixed to the sleeve by means of welding spots, strictly side by side with the adjacent sectors.

Figure 8:
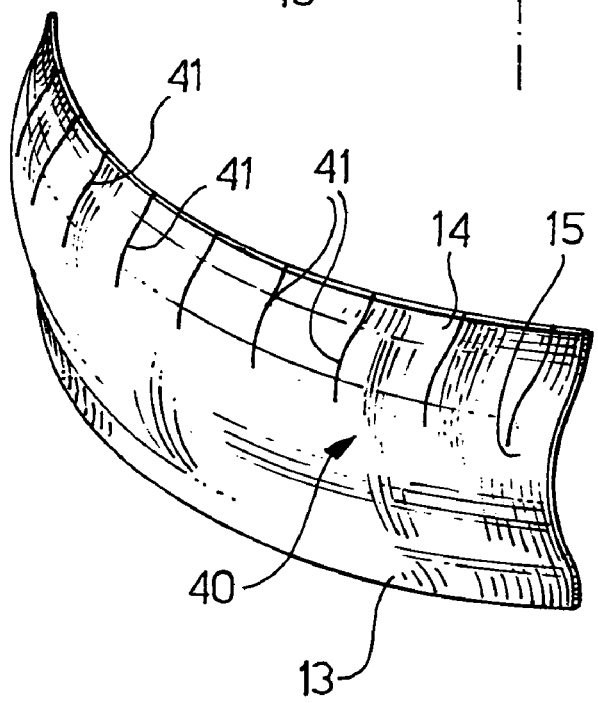
FIG. 8 shows a partial, perspective view of the detail of FIG. 2 according to a further alternative embodiment.

A foil 40, according to a further embodiment of the invention, is described with reference to FIG. 8, wherein the parts that are structurally and functionally equivalent to those of the foil 10, have the same reference numerals. The foil 40 is advantageously provided at its free edge 14, with a plurality of slits 41, distributed at a regular pitch, thirty-two in the example, thanks to which the edge 14 will lean and press against the sleeve 11 with improved pliability.

The main advantage of the chemical reactor according to the invention lies in its faultless reliability and in its operating safety. An extended service life can be obtained, without requiring maintenance.

A further advantage of the chemical reactor according to the present invention lies in its simple construction. Further on we shall expect that it will be possible to exploit the invention not only when manufacturing new chemical reactors, in series or singularly, but also when retrofitting or revamping old chemical reactors, where the wear and corrosion generally have worsened the already coarse initial tolerances. Or, even where the revamping requires the application of seals onto surfaces onto which the application of seals was not foreseen (and hence not suitable for conventional sealing systems). For example, in the case of chemical reactors such as burners, where the female member is usually completely coated with refractory material in the form of a refractory cement cast or refractory bricks.

A further advantage of the chemical reactor according to the present invention lies in its simple assembling by personnel working outside of the reactor without particular precautions and, so to say, blindly.

A further advantage of the chemical reactor according to the present invention is that it is very easy to be disassembled, just by extraction from outside without previous disassembling operations inside it.

Obviously a man skilled in the art can make a plurality of modifications to the above described reactor in order to fulfil specific and peculiar requirements, all falling within the scope of protection of the invention as defined in the following claims.

The invention claimed is:

1. A chemical reactor comprising:
   a casing with a bottom;
   a male member supported by the casing and inserted with a predetermined clearance in a female member associated to the casing;
   a sleeve fixedly connected to the male member; and
   a sealing means to hinder the fluid passage through the clearance between the male and female members;
   wherein said sealing means comprises a metallic foil in the form of an annular band provided within said clearance, a first edge of said foil being welded to said sleeve and a second edge of said foil leaning and pressing onto the sleeve, the metallic foil having dimensions such that a portion of said metallic foil is permanently deformed by insertion into said clearance to form a permanent deformation part pressing against said female member, and a portion of said metallic foil is elastically deformable to form a spring back part.

2. The chemical reactor according to claim 1, wherein said foil protrudes into said clearance.

3. The chemical reactor according to claim 2, wherein the foil annular band is of a predetermined height.

4. The chemical reactor according to claim 3, wherein said height of the foil annular band is approximately equal to 1/10 of the cross-sectional dimension of the male member.

5. The chemical reactor according to claim 4, wherein the foil annular band has an intermediate sealing portion protruding into said clearance, at least a portion of the intermediate sealing portion forming said permanent deformation part.

6. The chemical reactor according to claim 5, wherein the foil annular band has a substantially omega shaped section, wherein the omega wings form the first and the second edge and the arc shaped portion of the omega forms the intermediate sealing portion.

7. The chemical reactor according to claim 1, wherein the foil annular band is made of sectors singularly fastened to the sleeve.

8. The chemical reactor according to claim 3, wherein the second edge of the foil annular band is provided with transversal slits.

* * * * *